United States Patent
Nakao

(10) Patent No.: US 10,791,234 B2
(45) Date of Patent: Sep. 29, 2020

(54) IMAGE FORMING APPARATUS WITH MULTIPLE ACTIVATION MODES, ACTIVATION METHOD AND NON-TRANSITORY COMPUTER-READABLE RECORDING MEDIUM ENCODED WITH ACTIVATION PROGRAM

(71) Applicant: KONICA MINOLTA, INC., Chiyoda-ku, Tokyo (JP)

(72) Inventor: Takehisa Nakao, Toyokawa (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 16/297,844

(22) Filed: Mar. 11, 2019

(65) Prior Publication Data

US 2019/0306359 A1 Oct. 3, 2019

(30) Foreign Application Priority Data

Apr. 2, 2018 (JP) ................. 2018-071154

(51) Int. Cl.
 *H04N 1/04* (2006.01)
 *H04N 1/00* (2006.01)
(52) U.S. Cl.
 CPC ..... *H04N 1/00782* (2013.01); *H04N 1/00116* (2013.01); *H04N 1/00212* (2013.01); *H04N 1/00888* (2013.01)

(58) Field of Classification Search
 CPC .......... H04N 1/00782; H04N 1/00116; H04N 1/00212; H04N 1/00888
 USPC .......................................... 358/1.1–1.18, 474
 See application file for complete search history.

(56) References Cited

U.S. PATENT DOCUMENTS

| | | | | |
|---|---|---|---|---|
| 9,973,641 | B2* | 5/2018 | Kato | H04N 1/00891 |
| 2016/0142575 | A1* | 5/2016 | Yokoyama | H04N 1/00896 358/1.15 |
| 2016/0255234 | A1* | 9/2016 | Nishihara | H04N 1/00994 358/1.13 |
| 2017/0264766 | A1* | 9/2017 | Okamoto | H04N 1/00336 |
| 2018/0203651 | A1* | 7/2018 | Fukushima | G03G 15/5004 |

FOREIGN PATENT DOCUMENTS

| | | |
|---|---|---|
| JP | 2014030076 A | 2/2014 |
| JP | 2017140851 A | 8/2017 |

* cited by examiner

*Primary Examiner* — Gabriel I Garcia
(74) *Attorney, Agent, or Firm* — Buchanan Ingersoll & Rooney PC

(57) ABSTRACT

An image forming apparatus includes a hardware resource, and a hardware processor that controls the hardware resource, wherein the hardware processor activates the hardware resource in a first activation mode in response to entry of a user into a first range, and activates the hardware resource in a second activation mode that causes production of sound at a volume level higher than a volume level of sound produced in the first activation mode in response to entry of the user into a second range that is smaller than the first range.

27 Claims, 8 Drawing Sheets

IMAGE FORMING APPARATUS WITH MULTIPLE ACTIVATION MODES, ACTIVATION METHOD AND NON-TRANSITORY COMPUTER-READABLE RECORDING MEDIUM ENCODED WITH ACTIVATION PROGRAM

BACKGROUND

Technological Field

The present invention relates to an image forming apparatus, an activation method and a non-transitory computer-readable recording medium encoded with an activation program. In particular, the present invention relates to an image forming apparatus that switches operation modes, an activation method that is performed in the image forming apparatus and a non-transitory computer-readable recording medium encoded with an activation program for allowing the image forming apparatus to perform the activation method.

Description of the Related Art

An image forming apparatus represented by an MFP (Multi Function Peripheral) with a plurality of functions such as a facsimile machine, a copier and a scanner includes a function of switching an operation mode to a power saving mode that causes less power consumption than a normal mode in order to reduce the power consumption in the case where the MFP is not used by a user. This type of the MFP switches the operation mode to the normal mode in the case where being used by the user, and switches the operation mode to the power saving mode that causes less power consumption than the normal mode in the case where not being used by the user.

The technique, for switching the operation mode to the normal mode in response to detection of presence of the user in a predetermined range with respect to the MFP with the MFP in the power saving mode, has been known. However, in the case where the MFP switches from the power saving mode to the normal mode, a preparation period for execution of a process such as initialization of hardware resources included in the MFP is required. In this preparation period, a hardware resource which may need to be driven mechanically, produces predetermined sound. The user who is present in the predetermined range with respect to the MFP is not necessarily to operate the MFP. Therefore, even in the case where the user who is present in the predetermined range with respect to the MFP is not to use the MFP, sound is still produced by the hardware resource. There is a problem that it is bothersome for the user who is present in the vicinity of the MFP.

For example, Japanese Patent Laid-Open No. 2017-140851 describes a printing device that includes a printer unit, a control unit that controls an operation of the printer unit, a display unit, a touch panel for detecting a user operation for the display unit, a human detection sensor and a power control means for controlling to allow power to be supplied to the control unit based on a result of detection of the human detection sensor, and is characterized in that the control unit controls the printer unit to perform a specific operation and be capable of printing based on detection of the user operation by the touch panel, and the print unit does not perform the specific operation based on the result of detection by the human detection sensor.

In the print device described in Japanese Patent Laid-Open No. 2017-140851, it is possible to disable the print unit from producing sound until the user operates the touch panel. However, the preparation period from the time when the user operates the touch panel until the time when the print unit is able to print is required, and there is a problem that the user cannot immediately make the MFP print.

SUMMARY

According to one aspect of the present invention, an image forming apparatus comprising a hardware resource, and a hardware processor that controls the hardware resource, wherein the hardware processor activates the hardware resource in a first activation mode in response to entry of a user into a first range, and activates the hardware resource in a second activation mode that causes production of sound at a volume level higher than a volume level of sound produced in the first activation mode in response to entry of the user into a second range that is smaller than the first range.

According to another aspect of the present invention, an activation method that is performed in an image forming apparatus including a hardware resource, includes, in response to entry of a user into a first range, activating the hardware resource in a first activation mode, and, in response to entry of the user into a second range that is smaller than the first range, activating the hardware resource in a second activation mode that causes production of sound at a volume level higher than a volume level of sound produced in the first activation mode.

According to yet another aspect of the present invention, a non-transitory computer-readable recording medium encoded with an activation program executed by a computer controlling an image forming apparatus including a hardware resource, wherein the computer, in response to entry of a user into a first range, activates the hardware resource in a first activation mode, and in response to entry of the user into a second range that is smaller than the first range, activates the hardware resource in a second activation mode that causes production of sound at a volume level higher than a volume level of sound produced in the first activation mode.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
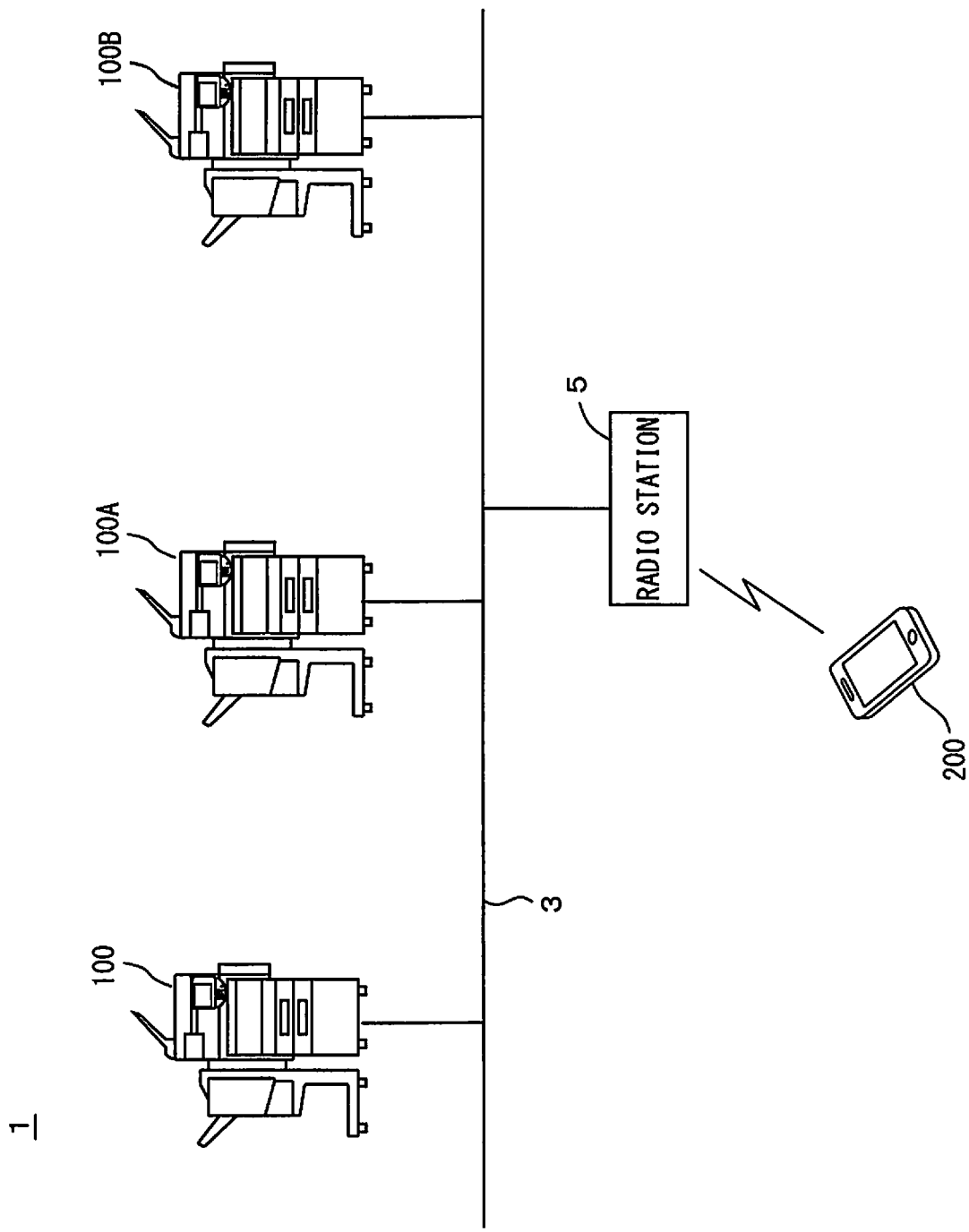
FIG. 1 is a diagram showing an overview of an image forming system in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing an overview of an image forming system in one embodiment of the present invention. Referring to FIG. 1, the image forming system 1 includes Multiple Function Peripherals (hereinafter referred to as "MFPs") 100, 100A, 100B respectively connected to a network 3, and a mobile communication terminal 200. The MFPs 100, 100A, 100B have the same configurations and functions, and therefore the MFP 100 will be taken as an example here unless stated otherwise.

The MFP (Multi Function Peripheral) 100 is an image forming apparatus and includes a scanner function for scanning a document, an image forming function for forming an image on a recording medium based on image data, and a facsimile function. The recording medium is a sheet such as a paper. While the MFP 100 is described as the image forming apparatus by way of example in the present embodiment, a printer or a facsimile machine, for example, including the image forming function may be used as the image forming apparatus instead of the MFP 100.

The network 3 is a Local Area Network (LAN), either wired or wireless. Further, the network 3 is not limited to the LAN and may be a Wide Area Network (WAN), the Internet or the like. The MFPs 100, 100A, 100B can communicate with one another via the network 3, and each of the MFPs 100, 100A, 100B can communicate with a PC 200 via the network 3.

The mobile communication terminal 200 at least includes a memory and a data communication portion to have short-range wireless communication with each of the MFPs 100, 100A, 100B. Here, the mobile communication terminal 200 is an RFID (Radio Frequency Identification) tag. The mobile communication terminal 200 is attached to, for example, a nameplate or a card worn by a user. The wireless communication between the mobile communication terminal 200 and each of the MFPs 100, 100A, 100B may be either by a communication medium of a Bluetooth (registered trademark) standard or the like using a radio wave or an electromagnetic wave, or a communication medium of an IrDA (Infrared Data Association) standard or the like using infrared rays. Also, the mobile communication terminal 200 may be a PDA (Personal Digital Assistants), a smartphone or the like having a data communication portion.

In the image forming system 1 in the present embodiment, the MFP 100 switches an operation mode to either a normal mode or a power saving mode that causes less power consumption than the normal mode. The power saving mode in the present embodiment is a state where the MFP 100 can detect a switching condition for switching the operation mode from the power saving mode to the normal mode. Specifically, when the MFP 100 in the present embodiment is in the power saving mode, at least the distance to the mobile communication terminal 200 is measurable, the operation unit 163 can detect an operation input by the user, the communication I/F unit 112 can detect the externally received data, and the facsimile unit 116 can receive facsimile data. Further, when being in the normal mode, the MFP 100 is in the state where power is supplied to part of the hardware resources and the part of the hardware resources can be driven immediately in addition to the state where power is supplied to all of the hardware resources included in the MFP 100 and all of the hardware resources can be driven immediately. Thus, the normal mode may include a plurality of stages with different levels of power consumption.

The mobile communication terminal 200 stores unique terminal identification information assigned to the mobile communication terminal 200. When the user approaches the MFP 100 while carrying the mobile communication terminal 200, the mobile communication terminal 200 and the MFP 100 become wirelessly communicable with each other. The MFP 100 measures the distance between the MFP 100 and the mobile communication terminal 200 by communicating with the mobile communication terminal 200. Then, when determining that the user has entered a first range that is defined with respect to the MFP 100, the MFP 100 starts a preparation operation that is required for the switch to the normal mode in a first activation mode. When determining that the user is in a second range that is defined with respect to the MFP 100, the MFP 100 executes the preparation operation, which is under execution in the first activation mode, in a second activation mode.

Figure 2:
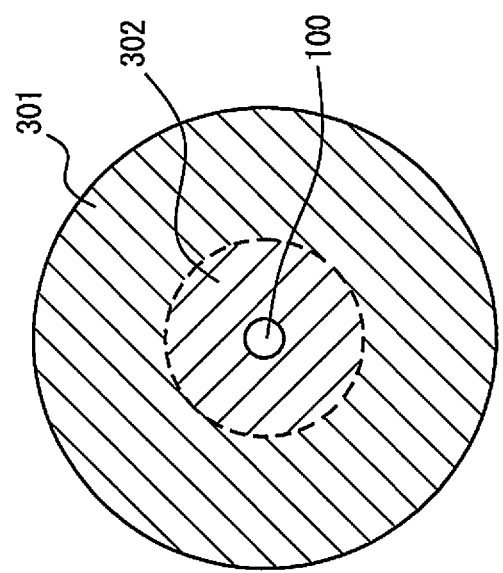
FIG. 2 is a diagram for explaining a first range and a second range with respect to an MFP.

FIG. 2 is a diagram for explaining the first range and the second range with respect to the MFP. Referring to FIG. 2, the first range 301 is the range within a first distance from the MFP 100. A second range 302 is within the second distance from the MFP 100. The second distance is shorter than the first distance. Here, the first distance is 10 m and the second distance is 2 m.

Figure 3:
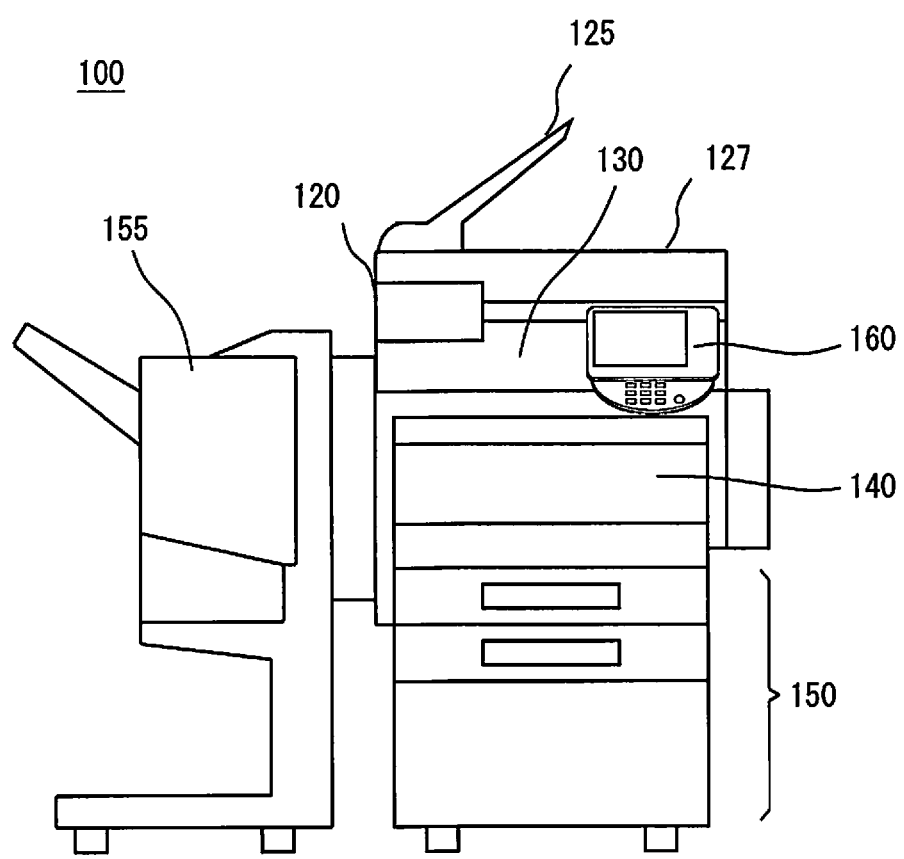
FIG. 3 is a perspective view showing the appearance of the MFP in one embodiment of the present invention.
Figure 4:
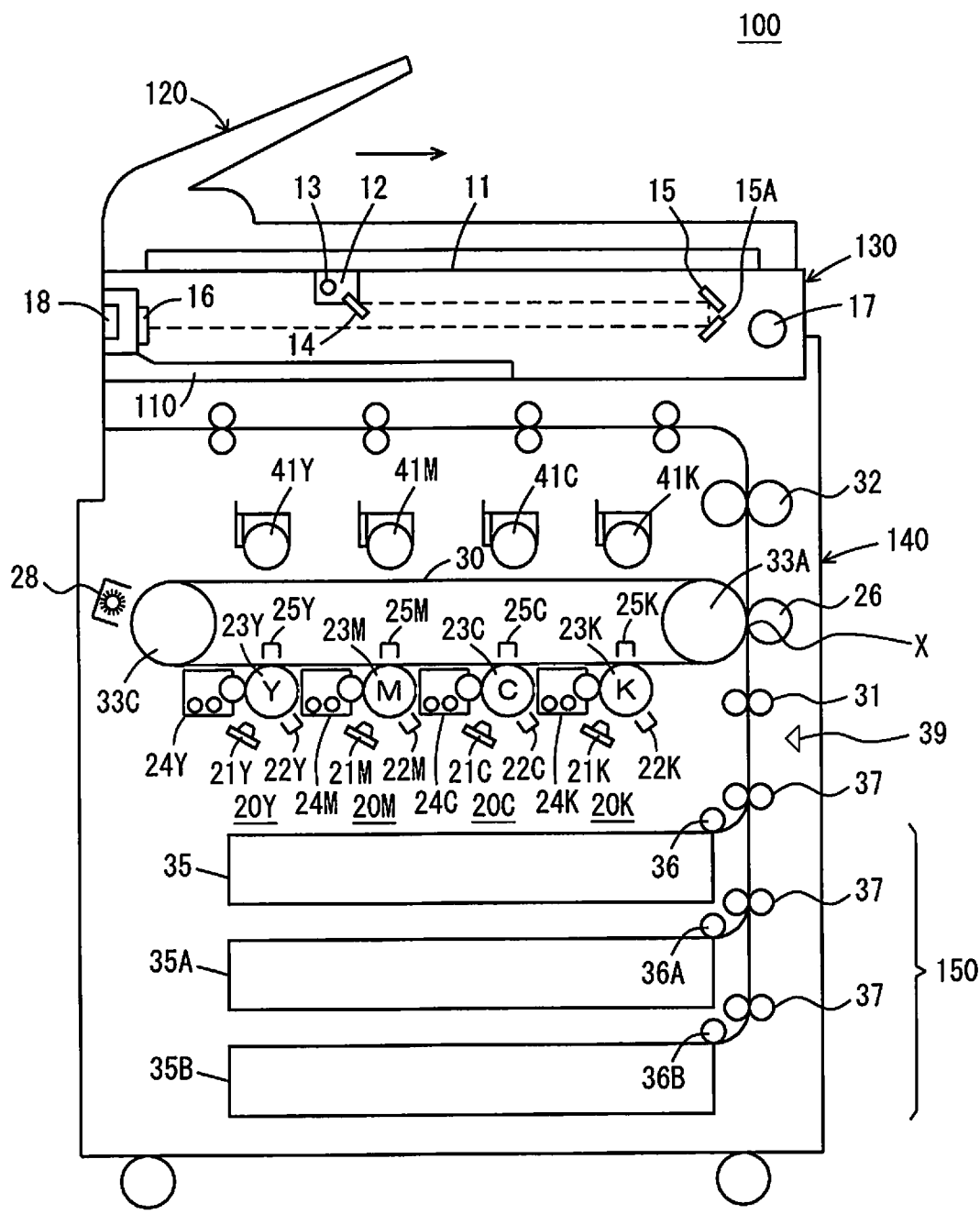
FIG. 4 is a schematic cross sectional view showing an inner configuration of the MFP.

FIG. 3 is a perspective view showing the appearance of the MFP in one embodiment of the present invention. FIG. 4 is a schematic cross sectional view showing the inner configuration of the MFP. Referring to FIGS. 3 and 4, the MFP 100 includes a document scanning unit 130 for scanning a document, an automatic document feeder 120 for conveying a document to the document scanning unit 130, an image forming unit 140 for forming a still image on the sheet of paper or other medium based on image data output by the document scanning unit 130 that has scanned a document, a sheet feed unit 150 for supplying the sheet to the image forming unit 140, a post-processing unit 155 and an operation panel 160 serving as a user interface.

The automatic document feeder 120 sorts one or more documents placed on a document tray 125 and conveys them to the document scanning unit 130 one by one. The automatic document feeder 120 includes a roller for transporting the sheet, and a motor and a gear for rotating the roller. Further, the automatic document feeder 120 rotates the roller in order to adjust a position of the roller as an initialization process.

The document scanning unit 130 exposes an image in a document set on a document glass 11 by the automatic document feeder 120 using an exposure lamp 13 attached to a slider 12 moving below. The light reflected from the document is led to a lens 16 by a mirror 14 and two reflection mirrors 15, 15A, and forms an image on a CCD (Charge Coupled Devices) sensor 18. The exposure lamp 13 and the mirror 14 are attached to the slider 12, and the slider 12 moves in the direction (a sub-scanning direction) indicated by an arrow in the diagram at a speed V corresponding to a magnification ratio. Thus, the entire document set on the document glass 11 can be scanned. Further, the two reflection mirrors 15, 15A move in the direction indicated by the arrow in the diagram at a speed V/2 due to the movement of the exposure lamp 13 and the mirror 14. Thus, the optical path length, of the light emitted to the document by the exposure lamp 13 from the document from which the light is reflected to the CCD sensor 18 where an image is formed, is constant at all times. In the document scanning unit 130, the motive power of the scanner motor 17 is transmitted via the gear to the slider 12 and the reflection mirrors 15, 15A. When the operation mode switches from the power saving mode to the normal mode, the document scanning unit 130 performs shading correction as the initialization process and moves the slider 12 to a predetermined position.

The reflected light that has formed an image in the CCD sensor 18 is converted in the CCD sensor 18 into image data as an electric signal and sent to a main circuit 110 (see FIG. 4). After an A/D conversion process, a digital image process and the like are performed on the received analogue image data, the main circuit 110 outputs the image data to the image forming unit 140. The main circuit 110 converts the image data into print data for cyan (C), magenta (M), yellow (Y) and black (K), and outputs the print data to the image forming unit 140.

The image forming unit 140 has developers 24Y, 24M, 24C, 24K and respectively corresponding detachable attachable tonner bottles 41Y, 41M, 41C, 41K. The tonner bottles 41Y, 41M, 41C, 41K respectively store yellow toner, magenta tonner, cyan tonner and black tonner. Here, "Y", "M", "C" and "K" respectively represent yellow, magenta, cyan and black. The tonner bottles 41Y, 41M, 41C, 41K are held by a holding mechanism driven by a motor. The motive power of the motor is transmitted to the holding mechanism via a gear, and the tonner bottles 41Y, 41M, 41C, 41K are rotated. The tonner bottles 41Y, 41M, 41C, 41K have spiral projections therein. When the tonner bottles 41Y, 41M, 41C, 41K are rotated by the holding mechanism, the tonner inside of each of the tonner bottles 41Y, 41M, 41C, 41K is supplied to each of the developers 24Y, 24M, 24C, 24K.

The image forming unit 140 includes respective image forming units 20Y, 20M, 20C, 20K for respective yellow, magenta, cyan and black. At least one of the image forming units 20Y, 20M, 20C, 20K is driven, so that an image is formed. When all of the image forming units 20Y, 20M, 20C, 20K are driven, a full color image is formed. The print data for yellow, magenta, cyan and black are respectively input in the image forming units 20Y, 20M, 20C, 20K. The only difference among the image forming units 20Y, 20M, 20C, 20K is the color of tonner handled by the image forming units 20Y, 20M, 20C, 20K. Here, the image forming unit 20Y for forming an image in yellow will be described.

The image forming unit 20Y includes an exposure head 21Y in which print data for yellow is to be input, a photoreceptor drum (an image carrier) 23Y, an electric charger 22Y, the developer 24Y and a transfer charger 25Y. The developer 24Y includes a screw shaft for stirring the tonner supplied from the tonner bottle 41Y, a motor for rotating the screw shaft and a gear for transmitting the motive power of the motor to the screw shaft. The exposure head 21Y emits laser light according to the received print data (an electric signal). The received laser light is one-dimensionally scanned by a polygon mirror included in the exposure head 21Y and exposes the photoreceptor drum 23Y. The direction in which the laser light one-dimensionally scans the photoreceptor drum 23Y is a main scanning direction. Further, the exposure head 21Y includes a motor and a gear for rotating the polygon mirror.

The photoreceptor drum 23Y rotates when the motive power of the motor is transmitted via the gear. After being charged by the electric charger 22Y, the photoreceptor drum 23Y is irradiated with the laser light emitted by the exposure head 21Y. Thus, an electrostatic latent image is formed on the photoreceptor drum 23Y. Subsequently, the tonner is applied onto the electrostatic latent image by the developer 24Y, and a tonner image is formed. The tonner image formed on the photoreceptor drum 23Y is transferred onto an intermediate transfer belt 30 by the transfer charger 25Y.

On the other hand, the intermediate transfer belt 30 is suspended by a driving roller 33C and a roller 33A not to loosen. The driving roller 33C rotates when the motive power of the motor is transmitted via the gear. When the driving roller 33C rotates in an anti-clockwise direction in the diagram, the intermediate transfer belt 30 rotates in the anti-clockwise direction in the diagram at a predetermined speed. The roller 33A rotates in the anti-clockwise direction due to the rotation of the intermediate transfer belt 30.

Thus, the image forming units 20Y, 20M, 20C, 20K sequentially transfer tonner images onto the intermediate transfer belt 30. Timing for transferring tonner images onto the intermediate transfer belt 30 by the forming units 20Y, 20M, 20C, 20K is adjusted by detection of a reference mark applied to the intermediate transfer belt 30. Thus, tonner images in yellow, magenta, cyan and black are superimposed on the intermediate transfer belt 30.

The tonner images formed on the intermediate transfer belt 30 are transferred to the sheet by the transfer roller 26. The sheet to which the tonner images have been transferred is transported to a pair of fuser rollers 32 and heated by the pair of fuser rollers 32. Thus, the tonner is melted and fused onto the sheet. Thereafter, the sheet is transported to the post-processing unit 155. Motive power is transmitted to the pair of fuser rollers 32 from the motor via the gear.

When the operation mode switches from the power saving mode to the normal move at activation, the image forming unit 20Y rotates the tonner bottle 41Y and supplies the tonner to the developer 24Y until the concentration of tonner in the developer 24Y becomes a suitable concentration, and rotates the screw shaft of the developer 24Y. Further, when the operation mode switches from the power saving mode to the normal mode at activation, the image forming unit 140 forms the tonner in a test pattern on the intermediate transfer belt 30 in order to carry out calibration of the image forming units 20Y, 20M, 20C, 20K. Therefore, the image forming unit 140 rotates the exposure head 21Y, the photoreceptor drum 23Y, photoreceptor drums 23M, 23C, 23K and the driving roller 33C. Further, at the activation, the image forming unit 140 rotates the pair of fuser rollers 32 until the temperature of the pair of fuser rollers 32Y become a predetermined temperature. When the operation mode switches from the power saving mode to the normal mode at the activation, the pair of fuser rollers 32 is heated while being rotated until the temperature of the pair of fuser rollers 32 becomes the predetermined temperature.

The sheets in different sizes are respectively set in sheet feed cassettes 35, 35A, 35B. The sheets respectively stored in the sheet feed cassettes 35, 35A, 35B are supplied to a transport path by outlet rollers 36, 36A, 36B respectively attached to the sheet feed cassettes 35, 35A, 35B and sent to a timing roller 31 by a sheet feed roller 37.

The sheet feed cassettes 35, 35A, 35B respectively include lift-up mechanisms for lifting stored sheet bundles. Each lift-up mechanism includes a lifting-lowering plate on which a sheet bundle is placed, a screw shaft for lifting the lifting-lowering plate and a gear for transmitting motive power of the motor to the screw shaft. For example, when the operation mode switches from the power saving mode to the normal mode, the sheet feed cassette 35 lifts the lifting-lowering plate by rotating the screw shaft until the sheet at the top of the sheet bundle stored in the sheet feed cassette 35 comes into contact with the outlet roller 36.

In the case where forming a full color image, the MFP 100 drives all of the image forming units 20Y, 20M, 20C, 20K. However, when forming a monochrome image, the MFP 100 drives one of the image forming units 20Y, 20M, 20C, 20K. Further, the MFP 100 can form an image by a combination of two or more than two of the image forming units 20Y, 20M, 20C, 20K. While a tandem-system MFP 100 including the image forming units 20Y, 20M, 20C, 20K that respectively form toner on the sheet in four colors is described here, a four-cycle system MFP that sequentially transfers the tonner of four colors to the sheet using one photoreceptor drum may be used.

The post-processing unit 155 includes a plurality of sheet discharge trays driven by a motor. The plurality of sheet discharge trays are configured to move in an up-and-down direction by rotation of a screw shaft. The motive power of the motor is transmitted to the screw shaft by the gear. The post-processing unit 155 receives the sheet on which an image is formed by the image forming unit 140 and performs post-processing on the sheet. While not being limited, the post-processing includes a process of sorting a plurality of sheets by transporting the plurality of sheets to one of the plurality of sheet discharge trays, a process of punching holes in the sheet and a process of stapling the sheet. When the operation mode switches from the power saving mode to the normal mode at the activation, the post-processing unit 155 rotates the screw shaft, and lifts or lowers the plurality of sheet discharge trays until the plurality of sheet discharge trays are moved to an initial position by rotation of the screw shaft.

Figure 5:
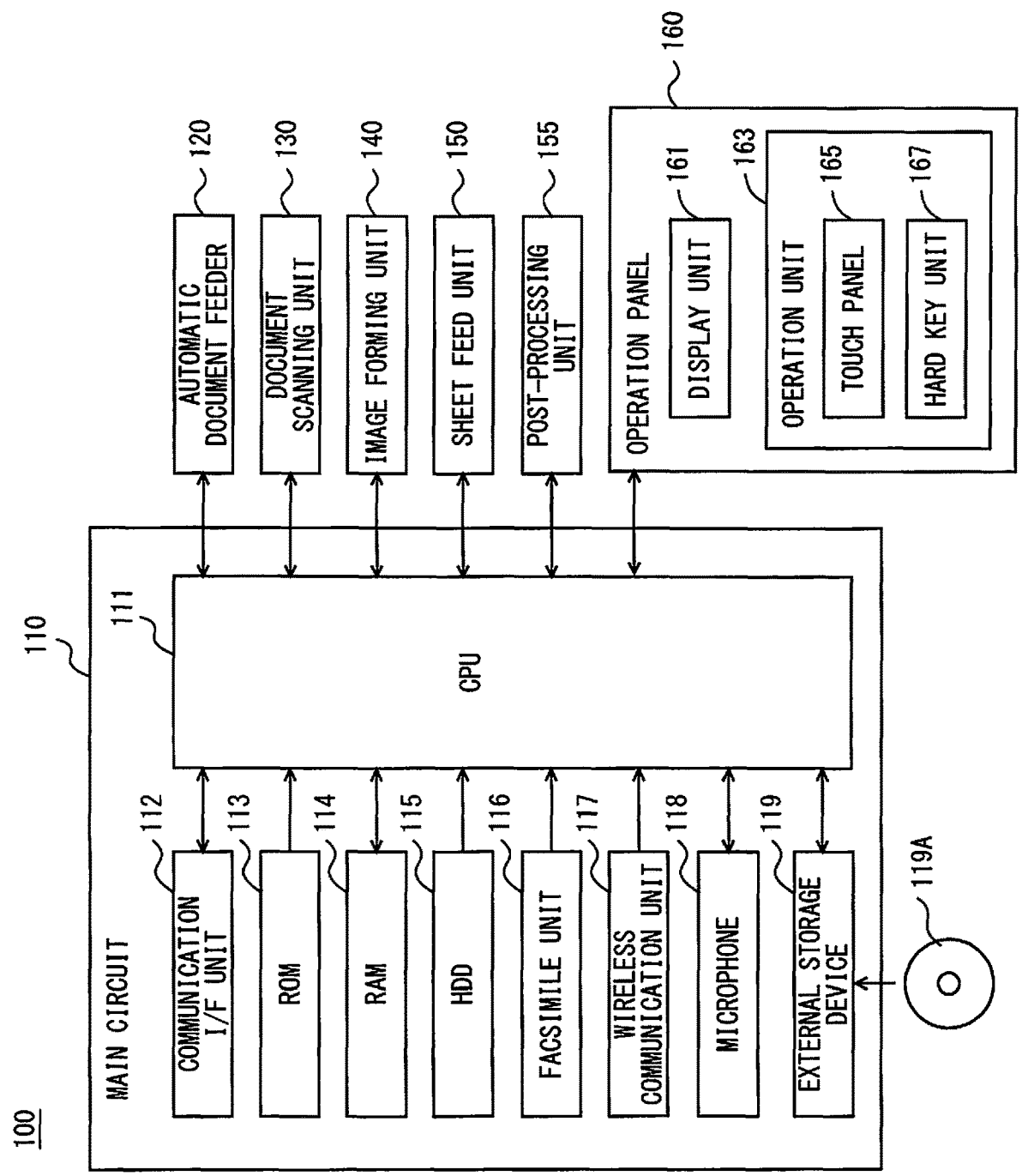
FIG. 5 is a block diagram showing an outline of a hardware configuration of the MFP.

FIG. 5 is a block diagram showing the outline of a hardware configuration of the MFP. Referring to FIG. 5, the MFP 100 is one example of an image forming apparatus and includes the main circuit 110, the document scanning unit 130 for scanning a document, the automatic document feeder 120 for conveying a document to the document scanning unit 130, the image forming unit 140 for forming an image on the sheet based on image data, the sheet feed unit 150 for supplying the sheet to the image forming unit 140, the post-processing unit 155 and the operation panel 160 serving as a user interface.

The automatic document feeder 120 automatically transports a plurality of documents set on the document tray 125 to a document scanning position in the document scanning unit 130 one by one, and discharges the document having the formed image that has been scanned by the document scanning unit 130 onto a document discharge tray 127. The automatic document feeder 120 includes a document detection sensor for detecting a document placed on the document tray 125.

The document scanning unit 130 has a rectangular scan surface for scanning a document. The scan surface is formed of a platen glass, for example. The automatic document feeder 120 is connected to the main body of the MFP 100 to be rotatable about an axis in parallel to one edge of the scan surface and can be open or closed. The document scanning unit 130 is arranged below the automatic document feeder 120, and the scan surface of the document scanning unit 130 is exposed in an open state where the automatic document feeder 120 is opened after being rotated. Therefore, the user can place a document on the scan surface of the document scanning unit 130. The automatic document feeder 120 can change between an open state where the scan surface of the document scanning unit 130 is exposed and a close state where the scan surface is covered. The automatic document feeder 120 includes a state detection sensor for detecting the open state of the automatic document feeder 120.

The document scanning unit 130 includes a light source for emitting light and an optoelectronic transducer for receiving light, and scans the image formed on a document placed on the scan surface. In the case where the document is placed on a scan region, the light emitted from the light source is reflected by the document, and the reflected light forms an image on the optoelectronic transducer. When receiving the light reflected from the document, the optoelectronic transducer produces the image data by converting the received light into an electrical signal. The document scanning unit 130 outputs the image data to the CPU 111.

The sheet feed unit 150 transports the sheet stored in a sheet feed tray to the image forming unit 140. The image forming unit 140 is controlled by the CPU 111 and forms an image using a well-known electrophotographic method. The image forming unit 140 forms an image on the sheet that has been conveyed by the sheet feed unit 150 based on the image data received from the CPU 111 and discharges the sheet having the image formed thereon to the post-processing unit 155. The image data output by the CPU 111 to the image forming unit 140 includes image data such as externally received print data in addition to the image data received from the document scanning unit 130.

The main circuit 110 includes a CPU (Central Processing Unit) 111 that controls the MFP 100 as a whole, a communication interface (I/F) unit 112, a ROM (Read Only Memory) 113, a RAM (Random Access Memory) 114, a hard disk drive (HDD) 115 as a mass storage device, a facsimile unit 116, a wireless communication unit 117, a microphone 118 and an external storage device 119. The CPU 111 is connected to the automatic document feeder 120, the document scanning unit 130, the image forming unit 140, the sheet feed unit 150 and the operation panel 160, and controls the MFP 100 as a whole.

The ROM 113 stores a program to be executed by the CPU 111 or data necessary for execution of the program. The RAM 114 is used as a work area when the CPU 111 executes the program. Further, the RAM 114 temporarily stores image data successively transmitted from the document scanning unit 130.

The operation panel 160 is provided on the upper surface of MFP 100. The operation panel 160 includes a display unit 161 and an operation unit 163. The display unit 161 is a Liquid Crystal Display (LCD), for example, and displays instruction menus to users, information about the acquired image data and other information. For example, an organic EL (Electroluminescence) display can be used instead of the LCD as long as the device displays images.

The operation unit 163 includes a touch panel 165 and a hard key unit 167. The touch panel 165 is a capacitance type. Not only the capacitance type but also another type such as a resistive film type, a surface acoustic wave type, an infrared type and an electromagnetic induction type can be used for the touch panel 165.

The detection surface of the touch panel 165 is provided to be superimposed on the upper surface or the lower surface of the display unit 161. Here, the size of the detection surface of the touch panel 165 is equal to the size of the display surface of the display unit 161. Thus, the coordinate system of the display surface and the coordinate system of the detection surface are equal to each other. The touch panel 165 detects the position designated by the user in the display surface of the display unit 161 and outputs the coordinates of the detected position to the CPU 111. The coordinate system of the display surface and the coordinate system of the detection surface are the same, so that the coordinates output by the touch panel 165 can be replaced as the coordinates of the display surface.

The hard key unit 167 includes a plurality of hard keys. The hard keys are contact switches, for example. The touch panel 165 detects the position designated by the user in the display surface of the display unit 161. In the case where operating the MFP 100, the user is likely to be in an upright attitude. Thus, the display surface of the display unit 161, the operation surface of the touch panel 165 and the hard key unit 167 are arranged to face upward. This is for the purpose of enabling the user to easily view the display surface of the display unit 161 and easily give an instruction to the operation unit 163 with his or her finger.

The communication I/F unit 112 is an interface for connecting the MFP 100 to the LAN 3. The communication I/F unit 112 communicates with the other MFPs 100A, 100B connected to the network 3 using a communication protocol such as a TCP (Transmission Control Protocol) or an FTP (File Transfer Protocol). The network 3 to which the communication I/F unit 112 is connected is either wired or wireless. Further, the network is not limited to a Local Area Network and may be a Wide Area Network (WAN), a PSTN, the Internet or the like.

The facsimile unit 116 is connected to the Public Switched Telephone Network (PSTN), and transmits facsimile data to or receives facsimile data from the PSTN. The facsimile unit 116 stores the received facsimile data in the HDD 115, converts the received facsimile data into print data that is printable in the image forming unit 140 and outputs the print data to the image forming unit 140. Thus, the image forming unit 140 forms the image represented by the facsimile data received from the facsimile unit 116 on the sheet. Further, the facsimile unit 116 converts the data stored in the HDD 115 into facsimile data, and transmits the facsimile data to a facsimile machine connected to the PSTN.

The wireless communication unit 117 wirelessly communicates with a device in a short distance. For example, the wireless communication unit 117 communicates wirelessly with the mobile communication terminal 200 on the basis of a GAP (Generic Access Profile) of the Bluetooth (registered trademark) standards. The wireless communication unit 117 outputs the strength of the radio wave received from the mobile communication terminal 200 to the CPU 111. The CPU 111 measures the distance to the mobile communication terminal 200 based on the strength of the radio wave received from the wireless communication unit 117.

The external storage device 119 is controlled by the CPU 111 and mounted with a CD-ROM (Compact Disk ROM) 119A or a semiconductor memory. While the CPU 111 executes the program stored in the ROM 113 by way of example in the present embodiment, the CPU 111 may control the external storage device 119, read out the program to be executed by the CPU 111 from the CD-ROM 119A and store the read program in the RAM 114 for execution.

The recording medium for storing the program to be executed by the CPU 111 is not limited to the CD-ROM 119A. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM or an EPROM (Erasable Programmable ROM). Further, the CPU 111 may download the program from the computer connected to the network 3 and store the program in the HDD 115. Alternatively, the computer connected to the network 3 may write the program in the HDD 115, and then the program stored in the HDD 115 may be loaded into the RAM 114 to be executed in the CPU 111. The program referred to here includes not only a program directly executable by the CPU 111 but also a source program, a compressed program, an encrypted program or the like.

Figure 6:
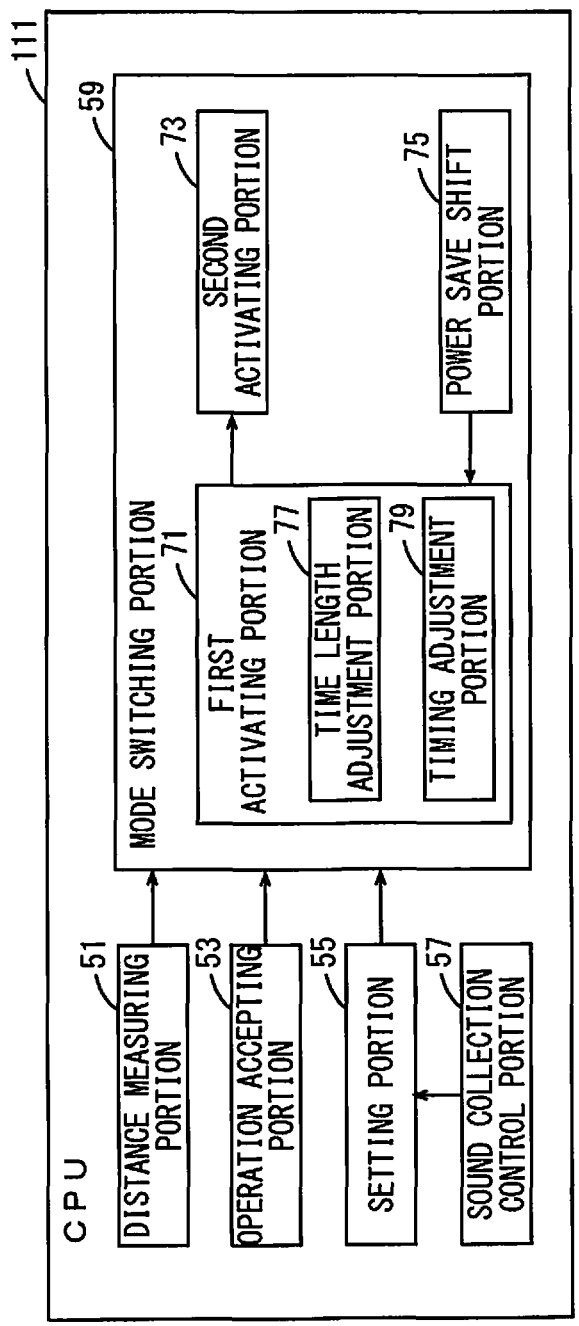
FIG. 6 is a block diagram showing one example of an outline of functions of a CPU included in the MFP.

FIG. 6 is a block diagram showing one example of an outline of functions of the CPU included in the MFP. The functions shown in FIG. 6 are formed in the CPU 111 when the CPU 111 included in the MFP 100 executes an activation program stored in the ROM 113, the HDD 115 or the CD-ROM 119A. Referring to FIG. 5, the CPU 111 included in the MFP 100 includes a distance measuring portion 51, an operation accepting portion 53, a setting portion 55, a sound collection control portion 57 and a mode switching portion 59.

The distance measuring portion 51 controls the wireless communication unit 117 and allows the wireless communication unit 117 to communicate with the mobile communication terminal 200. Specifically, the distance measuring portion 51 allows the wireless communication unit 117 to regularly output transmission requests for transmission of terminal identification information. When the wireless communication unit 117 receives the terminal identification information that is transmitted by the mobile communication terminal 200 that has received the transmission request, the distance measuring portion 51 accepts the terminal identification information from the wireless communication unit 117. Further, the wireless communication unit 117 measures the strength of the radio wave output by the mobile communication terminal 200, and the distance measuring portion 51 accepts the strength of the radio wave as well as the terminal identification information from the wireless communication unit 117.

The distance measuring portion 51 measures the distance to the mobile communication terminal 200 based on the strength of the radio wave transmitted by the mobile communication terminal 200. Specifically, how far the mobile communication terminal 200 is positioned from the MFP 100 is measured based on the strength of the radio wave (strength of an electric field) that has been received by the wireless communication unit 117. The distance measuring portion 51 may request the mobile communication terminal 200 to transmit the data indicating the value of the strength of the radio wave that has been received by the mobile communication terminal 200, calculate the difference between the value of the strength of the radio wave transmitted from the mobile communication terminal 200 and the value of the strength of the radio wave that has been transmitted to the mobile communication terminal 200 by the wireless communication unit 117 and acquire the distance based on the difference.

When measuring the distance to the mobile communication terminal 200, the distance measuring portion 51 compares the distance with the predetermined first distance and second distance. The first distance is longer than the second distance. Here, the first distance is 10 m, and the second distance is 2 m. The respective first and second distances are not limited to these respective values. When the distance to the mobile communication terminal 200 is not longer than the first distance but is longer than the second distance, the distance measuring portion 51 outputs a first signal indicating that the mobile communication terminal 200 is positioned in the first range 301 with respect to the MFP 100 to the mode switching portion 59. Further, when the distance to the mobile communication terminal 200 is not longer than the second distance, the distance measuring portion 51 outputs a second signal indicating that the mobile communication terminal 200 is positioned in the second range 302 with respect to the MFP 100 to the mode switching portion 59.

While the distance measuring portion 51 measures the distance to the mobile communication terminal 200 based on the strength of the radio wave output by the mobile communication terminal 200 in this case, the wireless communication unit 117 may transmit a transmission request for transmission of the terminal identification information using two radio waves having different strengths and may detect whether the mobile communication terminal 200 is positioned in the first range 301 or the second range 302 with respect to the MFP 100. For example, the wireless communication unit 117 transmits a transmission request for transmission of the terminal identification information using the radio wave having a high strength that enables communication with a device positioned at a distance of up to the first distance and the radio wave having a weak strength that enables communication with a device positioned at a distance of up to the second distance. Then, in the case where the wireless communication unit 117 can receive the terminal identification information when the transmission request for the terminal identification information is transmitted by the radio wave having a strong strength, but the wireless communication unit 117 cannot receive the terminal identification information when the transmission request for the terminal identification information is transmitted by the radio wave having a weak strength, it is determined that the mobile communication terminal 200 is positioned in the first range 301. In the case where the wireless communication unit 117 can receive the terminal identification information either when the transmission request for the terminal identification information is transmitted with the radio wave having a high strength or when the transmission request for the terminal identification information is transmitted with the radio wave having a weak strength, it is determined that the mobile communication terminal 200 is positioned in the second range 302. In the case where the wireless communication unit 117 cannot receive the terminal identification information either when the transmission request for the terminal identification information is transmitted with the radio wave having a high strength or when the transmission request for the terminal identification information is transmitted with the radio wave having a weak strength, it is determined that the mobile communication terminal 200 is not positioned either in the first range 301 or the second range 302.

Further, the mobile communication terminal 200 may include two types of data communication portions that can provide communication over two different distances, the mobile communication terminal 200 may supply different terminal identification information pieces to the two types of the data communication portions, and then the MFP 100 may detect whether the mobile communication terminal 200 is positioned in the first range 301 or the second range 302 with respect to the MFP 100. For example, the distance over which the data communication portion that can provide long-distance communication can communicate is set as the first distance, and the distance over which the data communication portion that can provide short-distance communication can communicate is set as the second distance. Then, in the case where the MFP 100 can receive the terminal identification information that has been supplied to the data communication portion that can provide the longer-distance communication but cannot receive the terminal identification information that has been supplied to the data communication portion that can provide the short-distance communication, determination is made that the mobile communication terminal 200 is positioned in the first range 301. In the case where the MFP 100 can receive both of the terminal identification information that has been supplied to the data communication portion that can provide the long-distance communication and the terminal identification information that has been supplied to the data communication portion that can provide the short-distance communication, determination is made that the mobile communication terminal 200 is positioned in the second range 302. In the case where the MFP 100 cannot receive the terminal identification information that has been supplied to the data communication portion that can provide the long-distance communication or the terminal identification information that has been supplied to the data communication portion that can provide the short-distance communication, determination is made that the mobile communication terminal 200 is not positioned in either the first range 301 or the second range 302.

The operation accepting portion 53 controls the operation unit 163 and accepts a user's operation of inputting in the operation unit 163. In response to acceptance of the user's operation of inputting in the operation unit 163, the operation accepting portion 53 outputs the operation identification information for identifying the operation to the mode switching portion 59.

The mode switching portion 59 switches the operation mode of the MFP 100 to either the normal mode or the power saving mode that causes less power consumption than the normal mode. In the normal mode, the MFP 100 accepts a user's operation and can immediately execute the process corresponding to the operation. In the power saving mode, the power consumption is smaller than the power consumption in the normal mode. The power saving mode may include a state where power is not supplied to the hardware resources. The normal mode includes a state where power is supplied to the CPU 111 and the communication I/F unit 112 and the CPU 111 can communicate with an external computer in addition to a state where power is supplied to all of the hardware resources included in the MFP 100 and the hardware resources can immediately be driven. Therefore, the normal mode may include a plurality of stages with different levels of power consumption.

The mode switching portion 59 includes a first activating portion 71, a second activating portion 73 and a power save shift portion 75. In the case where the switching condition is satisfied when the MFP 100 is in the normal mode, the power save shift portion 75 switches the operation mode to the power saving mode. The switching condition is the condition for switching the operation mode from the normal mode to the power saving mode. For example, the switching condition is satisfied in the case where a predetermined period of time elapses with the MFP 100 unused. Specifically, the switching condition includes a first condition that is satisfied in the case where a predetermined period of time elapses with no input in the operation unit 163 by a user's operation, a second condition that is satisfied in the case where a predetermined period of time elapses with the communication I/F unit 112 not externally receiving data, a third condition that is satisfied in the case where a predetermined period of time elapses with the facsimile unit 116 not receiving facsimile data, and a fourth condition that is satisfied in the case where a user's predetermined operation is accepted. The switching condition is satisfied when at least one of the first to fourth conditions is satisfied. The switching condition is not limited to the first to fourth conditions, and another condition may be defined.

In response to reception of the first signal from the distance measuring portion 51, the first activating portion 71 activates hardware resources included in the MFP 100 in the first activation mode in order to switch the operation mode to the normal mode. Here, the hardware resources include the automatic document feeder 120, the document scanning unit 130, the image forming unit 140, the sheet feed unit 150 and a plurality of fans. The plurality of fans include a ventilating fan for ventilating the air inside of the MFP 100 and a cooling fan for cooling the other hardware devices. The first activation mode is the mode that causes hardware resources to be activated such that a preparation period for the hardware resources to become able to immediately start an operation is a first period. Specifically, the hardware resources include at least a motor, which is a power source. Further, the hardware resources may include a gear that transmits the motive power of the motor to a component. The first activating portion 71 rotates the motor, which is one of hardware resources, by a first number of rotations corresponding to the first period.

In response to reception of the first signal from the distance measuring portion 51, the first activating portion 71 activates the hardware resources in the first activation mode. However, in the case where a predetermined period of time elapses with no reception of the second signal after the reception of the first signal, or the case where the first signal is not received even when the predetermined period of time has not elapsed after the reception of the first signal, the first activating portion 71 stops the activation of the hardware resources. In the case where the predetermined period of time elapses with a person who has entered the first range 301 not entering the second range 302, it is estimated that the person is unlikely to use the MFP 100. In the case where the person who has entered the first range 301 leaves the first range 301 before the predetermined period of time elapses, it is estimated that the person is unlikely to use the MFP 100.

In response to reception of the second signal from the distance measuring portion 51, the second activating portion 73 activates the hardware resources included in the MFP 100 in the second activation mode in order to switch the operation mode to the normal mode. The second activation mode is a mode for activating the hardware resources, so that the preparation period for the hardware resources to become able to immediately start an operation is a second period. Specifically, the second activating portion 73 rotates the motor, one of the hardware resources, by a second number of rotations corresponding to the second period.

The rotation speed of the motor in the case where the hardware resource is activated in the first activation mode in the first period is lower than the rotation speed of the motor in the case where the hardware resource is activated in the second activation mode in the second period. Therefore, the first period is longer than the second period. The lower the rotation speed of the motor is, the lower the volume level of the sound produced by the motor is. Further, the smaller the number of rotations of the gear and the movement amount of a component are, the lower the volume level of the sound produced by engagement of gears and the movement amount of the component are. Therefore, the volume level of the sound produced by the hardware resources in the first period is lower than the volume level of the sound produced by the hardware resources in the second period.

The sound collection control portion 57 detects the sound produced in the surroundings of the MFP 100 as environmental sound. Specifically, the sound collection control portion 57 controls a microphone 118 and acquires the sound collected by the microphone 118 as the environmental sound. The sound collection control portion 57 outputs the volume level of the environmental sound to the setting portion 55.

The setting portion 55 receives the volume level of the environmental sound from the sound collection control portion 57. The setting portion 55 determines the first period based on the volume level of the environmental sound. The setting portion 55 outputs the determined first period to the mode switching portion 59. When the volume level of the environmental sound is high, the setting portion 55 sets the first period short. When the volume level of the environmental sound is low, the setting portion 55 sets the first period long. For example, the maximum values of the sound produced by the hardware resources are respectively measured in a plurality of different preparation periods in experiments or simulations, and are respectively defined for the plurality of preparation periods. The setting portion 55 determines that the preparation period in which the maximum value of the produced sound is equal to or lower than the volume level of the environmental sound as the first period. In the case where there are the plurality of preparation periods in which the maximum values of the produced sound are equal to or lower than the volume levels of the environmental sound, the longest preparation period out of the plurality of preparation periods in which the maximum values of the produced sound are equal to or lower than the volume levels of the environmental sound is preferably determined as the first period.

Further, in the case where a plurality of hardware resources are present, the setting portion 55 determines the first period for each of the plurality of hardware resources. Because the first period is set for each of the plurality of hardware resources, in the case where the volume levels of the produced sound are different for the plurality of hardware resources, the upper limit of the maximum value of the volume level of the sound produced by each of the plurality of hardware resources can be defined.

The first activating portion 71 includes a period adjusting portion 77 and a timing adjusting portion 79. After receiving the first signal from the distance measuring portion 51, the period adjusting portion 77 activates hardware resources in the first period that is input by the setting portion 55. The period adjusting portion 77 controls the hardware resource and rotates the motor by the number of rotations corresponding to the first period.

In the case where the volume level of the environmental sound is extremely low, etc., there may not be any preparation period in which the maximum value of the produced sound is equal to or lower than the volume level of the environmental sound. In this case, the setting portion 55 may determine that a default value is the first period.

The timing adjusting portion 79 adjusts the time point at which each of the plurality of hardware resource is activated. The volume level of the sound produced by each of the hardware resources in the preparation period may change with an elapse of time. In this case, the time points at which the volume levels of the produced sound are maximized in the preparation period may be different for the plurality of hardware resources. The timing adjusting portion 79 makes adjustment such that the plurality of hardware resources are respectively activated at different time points. Thus, the volume levels of the sound produced by the plurality of hardware resources are respectively maximized at different time points.

Figure 7A:
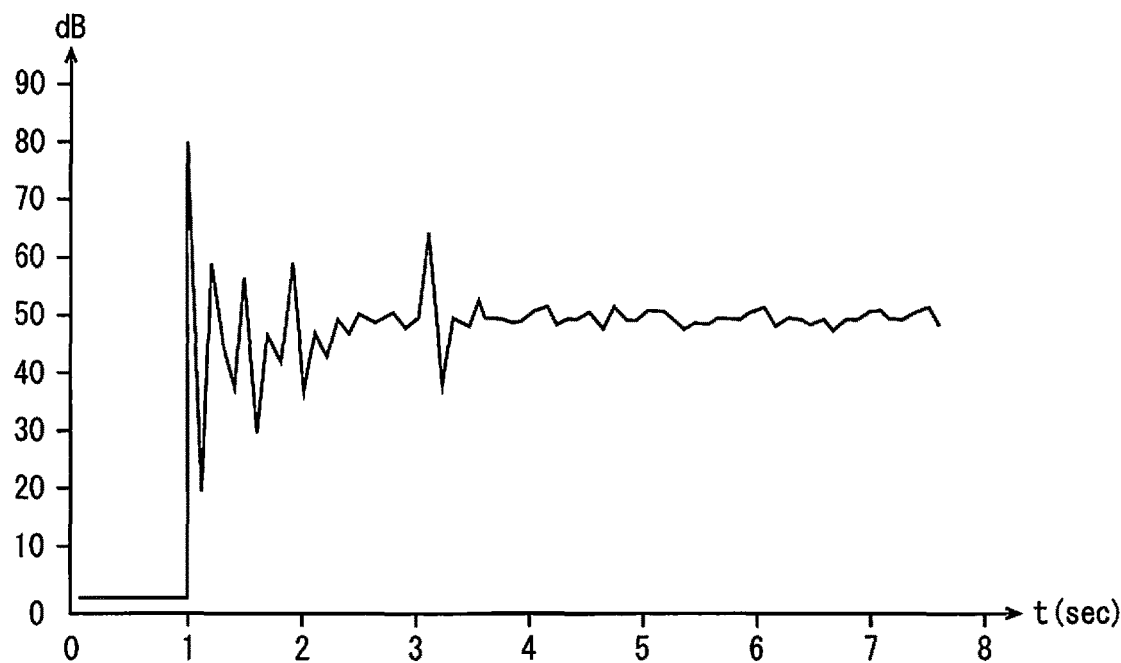
FIGS. 7A and 7B are diagrams for explaining time points at which activation of hardware resources is started.
Figure 7B:
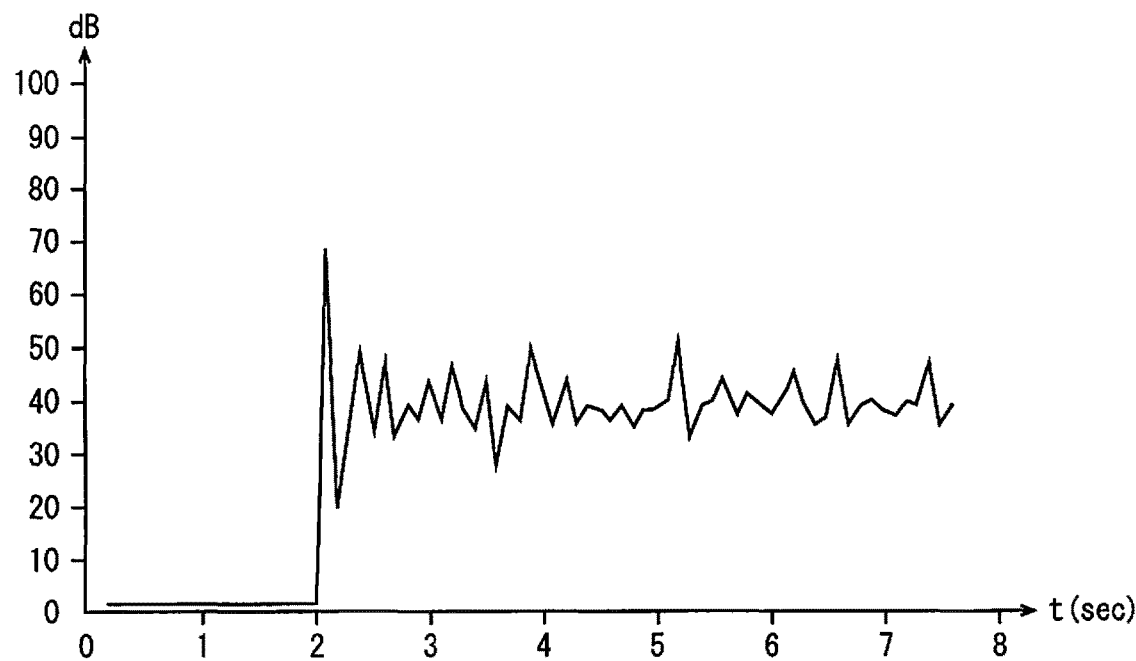

FIGS. 7A and 7B are diagrams for explaining the time points at which activation of hardware resources are started. FIG. 7A is a diagram showing one example of the sound produced by a first hardware resource. The abscissa is the time axis, and the ordinate indicates the volume level of the produced sound. FIG. 7B is a diagram showing one example of the sound produced by a second hardware resource. The abscissa is the time axis, and the ordinate indicates the volume level of the produced sound. The first hardware resource is activated in one second from the start of the first period by way of example, and the second hardware resource is activated in two seconds from the start of the first period by way of example. The time points at which the sound produced by the first hardware resource and the sound produced by the second hardware resource are respectively maximized right after the start of activation. Therefore, after the sound produced by the first hardware resource is maximized, the sound produced by the second hardware resource is maximized Because the sound produced by the first hardware resource and the sound produced by the second hardware resource are not maximized at the same time, the maximum value of the sound produced by the whole of the two hardware resources can be as low as possible.

Figure 8:
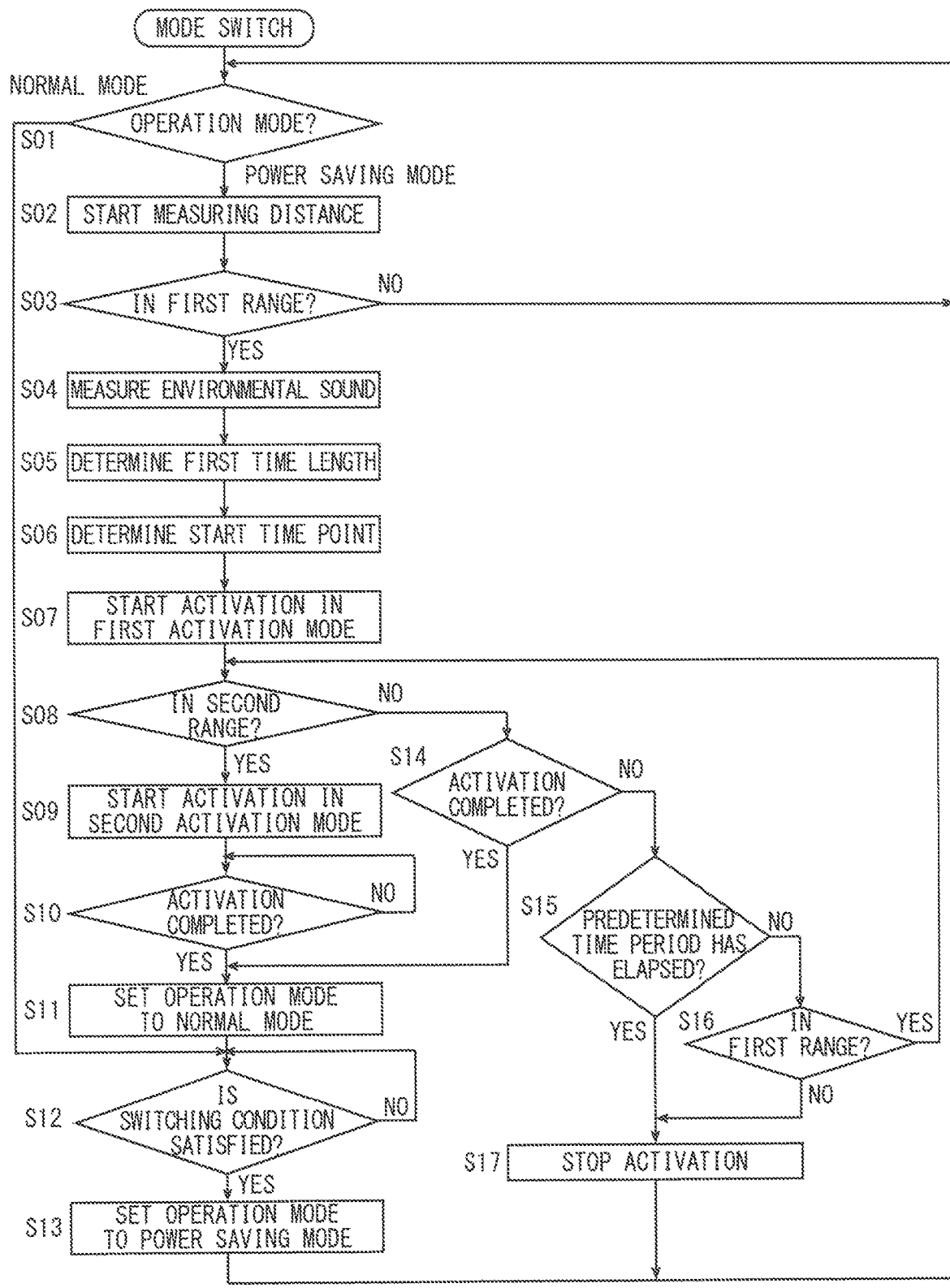
FIG. 8 is a flow chart showing one example of a flow of a mode switching process.

FIG. 8 is a flow chart showing one example of a flow of a mode switching process. The mode switching process is the process performed by the CPU 111 when the CPU 111 included in the MFP 100 executes the activation program stored in the ROM 113, the HDD 115 or the CD-ROM 119A. Referring to FIG. 8, the CPU 111 included in the MFP 100 branches the process depending on the operation mode (step S01). If the operation mode is set to the power saving mode, the process proceeds to the step S02. If the operation mode is set to the normal mode, the process proceeds to the step S09.

In the step S02, the CPU 111 starts measuring the distance to a person who is in the vicinity of the MFP 100, and the process proceeds to the step S03. After the step S02, the CPU 111 measures the distance to the person every predetermined period of time. In the step S03, the CPU 111 detects a person in the first range 301. If the person in the first range is detected, the process proceeds to the step S04. If not, the process returns to the step S01.

In the step S04, the CPU 111 measures the environmental sound. The environmental sound collected by the microphone 118 is acquired. Then, the CPU 111 determines a first period (step S05). The maximum values of the sound produced by hardware resources are respectively measured for a plurality of different preparation periods in experiments or simulations. The CPU 111 determines the preparation period in which the maximum value of the sound produced by the hardware resources is equal to or lower than the volume level of the environmental sound as the first period. Thus, the first period in which the environmental sound is at a high volume level is longer than the first period in which the environmental sound is at a low volume level. In the case where there are a plurality of preparation periods in which the produced sound is at the volume level equal to or lower than the volume level of the environmental sound, the CPU 111 determines the longest preparation period, out of the plurality of preparation periods in which the produced sound is at the volume level equal to or lower than the volume level of the environmental sound, as the first period. Thus, the volume level of the sound produced by the hardware resources is equal to or lower than the volume level of the environmental sound, the CPU 111 can make it difficult for the user who is in the vicinity of the MFP 100 to hear the sound produced by the hardware resources. In the case where there is not any preparation period in which the produced sound is at the volume level equal to or lower than the volume level of the environmental sound, the CPU 111 determines a predetermined default value as the first period.

In the step S06, the time point at which is the activation is to be started is determined, and the process proceeds to the step S07. The CPU 111 determines the time point at which activation of the plurality of hardware resources is to be started. In the case where the time points at which the volume levels of the produced sound in the preparation period are maximized are different for the plurality of hardware resources, the CPU 111 makes determination such that the plurality of hardware resources are respectively activated at different time points. Thus, the volume levels of the sound produced by the plurality of hardware resources are maximized at different time points. Thus, the volume levels of the sound produced by the plurality of respective hardware resources are not maximized at the same time, so that the maximum value of the sound produced by all of the plurality of hardware resources can be as small as possible.

In the step S07, the activation of hardware resources is started in the first activation mode, and the process proceeds to the step S08. In the step S08, a person in the second range 302 is detected. If the person in the second range 302 is detected, the process proceeds to the step S09. If not, the process proceeds to the step S14. In the step S09, the activation of the hardware resources is started in the second activation mode, and the process proceeds to the step S10. In the step S10, the CPU 111 determines whether the activation, of the hardware resources, that is started in the step S09 has completed. The process waits until the activation is completed (NO in the step S10). If the activation is completed (YES in the step S10), the process proceeds to the step S11.

In the step S11, the operation mode is set to the normal mode, and the process proceeds to the step S12. In the step S12, the CPU 111 determines whether the switching condition is satisfied. The process waits until the switching condition is satisfied (NO in the step S12). If the switching condition is satisfied (YES in the step S12), the process proceeds to the step S13. In the step S13, the operation mode is set to the power saving mode, and the process returns to the step S01.

On the other hand, in the step S14, the CPU 111 determines whether the activation, of the hardware resources, that is started in the step S04 has completed. If the activation has been completed, the process proceeds to the step S11. If not, the process proceeds to the step S15. In the step S15, the CPU 111 determines whether a predetermined period of time has elapsed. If the predetermined period of time has elapsed since the detection of the person in the first range 301, the process proceeds to the step S17. If not, the process proceeds to the step S16. In the step S16, the CPU 111 detects the person in the first range 301. If the person is not detected in the first range 301, the process proceeds to the step S17. If the person is detected in the first range 301, the process returns to the step S08.

In the step S17, the CPU 111 stops the activation, of the hardware resources, that is started in the step S04, and the process returns to the step S01. In the case where the person does not enter the second range 302 or the person leaves the first range 301, even though the predetermined period of time has elapsed since the entry of the person into the first range 301, the person is unlikely to use the MFP 100. Therefore, the CPU 111 can stop the activation of the hardware resources and reduce the power consumption.

First Modified Example

While the MFP 100 measures the distance to a person who is carrying the mobile communication terminal 200 by communicating with the mobile communication terminal 200 in the above-mentioned embodiment, the technique for detecting the person who is present in the vicinity of the MFP 100 is not limited to this. For example, a human detection sensor may be used. The human detection sensor is a pyroelectric infrared sensor. The human detection sensor detects infrared rays generated by human bodies and detects changes in temperature. The human detection sensor outputs the value indicating the change in measured temperature to the CPU 111. Specifically, when a person enters a predetermined detectable range of the human detection sensor, the infrared rays received by the human detection sensor increase, so that an output value increases. When there is no movement of a person in the detectable range of the human detection sensor, the infrared rays received by the human detection sensor become constant. Thus, the output of the human detection sensor is settled and returns to an offset voltage. The higher the output value of the human detection sensor is, the shorter the distance between the human detection sensor and the person is. Thus, the person who is present in the vicinity of the MFP 100 can be detected, and the distance between the human detection sensor and the person can be detected.

Further, the MFP 100 may detect the presence of a person in the first range 301 in response to detection of the user by the human detection sensor, and may detect the presence of a person in the second range 302 in response to detection of a user's operation of inputting in the operation unit 163.

Second Modified Example

While the first period is determined according to the environmental sound in the above-mentioned embodiment, the first period may be constant regardless of the environmental sound. The microphone 118 is unnecessary in this case. The number of rotations of the motor of each of the plurality of hardware resources may be reduced to a certain ratio. The period adjusting portion 77 is unnecessary in this case.

While the time points at which the plurality of hardware resources are activated are adjusted, the plurality of hardware resources may be activated simultaneously. Also, the plurality of hardware resources may be activated at time points that are respectively predetermined for the plurality of resources. The timing adjusting portion 79 is unnecessary in this case.

As described above, the MFP 100 in the present embodiment functions as an image forming apparatus, activates hardware resources in the first activation mode in response to entry of the user into the first range, and activates the hardware resources in the second activation mode that causes the production of sound at the volume level higher than the volume level of the sound produced in the first activation mode in response to entry of the user into the second range. Therefore, in the case where the user has entered the first range but has not entered the second range, the hardware resources can be activated with the produced sound at the volume level lower than the volume level of the sound produced in the case where the user enters the second range. Therefore, in the case where the user passes by the MFP 100 without using the MFP 100, the volume level of the sound produced by the MFP 100 can be low. Further, in the case where the user uses the MFP 100, the activation can be completed at the time point at which the user arrives at the MFP 100.

Further, in the case where the user enters the first range and then leaves the first range without entering the second range, the activation of the hardware resources is stopped. Therefore, the time period in which sound is produced can be as short as possible.

Further, in the case where detecting the entry of the user into the first range, and then not detecting the entry of the user into the second range before a predetermined time period elapses, the MFP 100 stops the activation of the hardware resources. Therefore, in the case where the user does not use the MFP 100, the time period in which sound is produced can be as short as possible.

Further, because the MFP 100 activates the hardware resources with the operation mode switched to the power saving mode, in the case where the user passes by the MFP 100 without using the MFP 100, the power consumption can be as small as possible.

Further, the preparation period from the time when the hardware resources are stopped to the time when the hardware resources are operable is shorter in the case where the MFP 100 is activated in the second activation mode than in the case where the MFP 100 is activated in the first activation mode. Thus, the volume level of the sound produced by the hardware resources in the case where the MFP 100 is activated in the first activation mode can be low.

Further, because being able to set the first period in the MFP 100, the user can set the volume level of the sound produced by the hardware resources in the first period, which is the preparation period.

Further, in the MFP 100, the first period can be set according to the volume level of the environmental sound around the MFP 100. Therefore, the volume level of the sound produced by the hardware resources can be adjusted to the volume level of the environmental sound produced in the surroundings. Therefore, the first period can be as short as possible.

Further, in the MFP 100, the first period is set for each of the plurality of hardware resources. Therefore, in the case where the volume levels of the sound respectively produced by the plurality of hardware resources are different from one another, the upper limits of the maximum value of the volume level of the sound produced by the plurality of hardware resources can be respectively defined.

Further, because the MFP 100 adjusts the time points at which the plurality of hardware resources are respectively activated, in the case where the volume levels of the sound respectively produced by the plurality of hardware resources change over time, the volume levels of the sound produced by the plurality of hardware resources can respectively increase at different time points.

Further, because the MFP 100 determines that the user has entered the first range in response to the distance to the user being equal to or shorter than the first distance, the hardware resources can be activated based on the relative distance between the MFP 100 and the user.

Further, in response to the distance to the user being equal to or shorter than the second distance, which is shorter than the first distance, the MFP 100 determines that the user has entered the second range. Therefore, in the case where the distance between the user and the MFP 100 becomes shorter than the first distance, the MFP 100 can make the hardware resources operable as quickly as possible.

The MFP 100 determines that the user has entered the second range in response to acceptance of an operation by the operation unit 163. Therefore, in the case where the user operates the MFP 100, the MFP 100 can make the hardware resources operable as quickly as possible.

Further, in the MFP 100, the rotation speed of the motor during the activation in the first activation mode is lower than the rotation speed of the motor during the activation in the second activation mode. Therefore, the volume level of the sound produced by the motor during activation of the hardware resources in the first activation mode can be lower than the volume level of the sound produced by the motor during activation of the hardware resources in the second activation mode.

While the MFP 100 is explained as one example of the image forming apparatus in the above-mentioned embodiment, it is needless to say that the present invention can be specified as the activation method for allowing the MFP 100 to perform the mode switching process shown in FIG. 8 and the activation program for allowing the CPU 111 included in the MFP 100 to perform the activation method.

Although the present invention has been described and illustrated in detail, the disclosed embodiments are made for purposes of illustrated and example only and not limitation. The scope of the present invention should be interpreted by terms of the appended claims

What is claimed is:

1. An image forming apparatus comprising:
   a hardware resource; and
   a hardware processor that controls the hardware resource, wherein
   the hardware processor
   activates the hardware resource from a power saving mode to a first activation mode in response to entry of a user into a first range, wherein the first activation mode is less active than a state in which the apparatus is ready to perform an image forming operation, and
   activates the hardware resource to a second activation mode that causes production of sound at a volume level higher than a volume level of sound produced in the first activation mode in response to entry of the user into a second range that is smaller than the first range.

2. The image forming apparatus according to claim 1, wherein
   the hardware processor stops activation of the hardware resource in the case where the user leaves the first range after detection of the entry of the user into the first range.

3. The image forming apparatus according to claim 1, wherein
   the hardware processor, in the case where the entry of the user into the second range is not detected before a predetermined period of time elapses since detection of the entry of the user into the first range, stops activation of the hardware resource.

4. The image forming apparatus according to claim 1, wherein
   the hardware processor,
   in the case where a predetermined condition is satisfied in a normal mode, further switches an operation mode to a power saving mode that causes less power consumption than the normal mode, and
   activates the hardware resource in the first activation mode with the operation mode switched to the power saving mode.

5. The image forming apparatus according to claim 1, wherein
   a preparation period from a time when the hardware resource is stopped to a time when the hardware resource is operable is a first period in the case where the hardware resource is activated in the first activation mode, and is a second period, which is shorter than the first period, in the case where the hardware resource is activated in the second activation mode.

6. The image forming apparatus according to claim 5, wherein
   the hardware processor sets the first period.

7. The image forming apparatus according to claim 6, comprising a microphone that collects sound, wherein
   the hardware processor sets the first period according to a volume level of sound collected by the microphone.

8. The image forming apparatus according to claim 6, wherein
   the hardware processor sets the first period for each of a plurality of the hardware resources.

9. The image forming apparatus according to claim 1, wherein
   the hardware processor adjusts a time point at which each of a plurality of the hardware resources is to be activated in the first activation mode.

10. The image forming apparatus according to claim 1, wherein
    the hardware processor, in response to a distance to the user being equal to or shorter than a first distance, determines that the user has entered the first range.

11. The image forming apparatus according to claim 10, wherein
    the hardware processor, in response to the distance to the user being equal to or shorter than a second distance that is shorter than the first distance, determines that the user has entered the second range.

12. The image forming apparatus according to claim 10, further comprising an operation accepter that accepts an operation input by the user, wherein
    the hardware processor, in response to acceptance of the operation, determines that the user has entered the second range.

13. The image forming apparatus according to claim 1, wherein
    the hardware resource include a motor, and a rotation speed of the motor during activation in the first activation mode is lower than a rotation speed of the motor during activation in the second activation mode.

14. An activation method that is performed in an image forming apparatus including a hardware resource, including:
    in response to entry of a user into a first range, activating the hardware resource from a power saving mode to a first activation mode, wherein the first activation mode is less active than a state in which the apparatus is ready to perform an image forming operation; and
    in response to entry of the user into a second range that is smaller than the first range, activating the hardware resource to a second activation mode that causes production of sound at a volume level higher than a volume level of sound produced in the first activation mode.

15. The activation method according to claim 14, including stopping activation of the hardware resource in the case where the user leaves the first range after detection of the entry of the user into the first range.

16. The activation method according to claim 14, including stopping activation of the hardware resource in the case where the entry of the user into the second range is not detected before a predetermined period of time elapses since detection of the entry of the user into the first range.

17. The activation method according to claim 14, further including:
   in the case where a predetermined condition is satisfied in a normal mode, switching an operation mode to a power saving mode that causes less power consumption than the normal mode; and
   activating the hardware resource in the first activation mode with the operation mode switched to the power saving mode.

18. The activation method according to claim 14, wherein
   a preparation period from a time when the hardware resource is stopped to a time when the hardware resource is operable is a first period in the case where the hardware resource is activated in the first activation mode, and is a second period, which is shorter than the first period, in the case where the hardware resource is activated in the second activation mode.

19. The activation method according to claim 14, further including setting the first period.

20. The activation method according to claim 14, including setting the first period according to a volume level of sound collected by a microphone included in the image forming apparatus.

21. The activation method according to claim 14, including setting the first period for each of a plurality of the hardware resources.

22. The activation method according to claim 14, further including adjusting a time point at which each of a plurality of the hardware resources is to be activated in the first activation mode.

23. The activation method according to claim 14, including, in response to a distance to the user being equal to or shorter than a first distance, determining that the user has entered the first range.

24. The activation method according to claim 23, including, in response to the distance to the user being equal to or shorter than a second distance that is shorter than the first distance, determining that the user has entered the second range.

25. The activation method according to claim 23, including, in response to acceptance of an operation input by the user by an operation accepter included in the image forming apparatus, determining that the user has entered the second range.

26. The activation method according to claim 14, wherein
   the hardware resource includes a motor, and
   a rotation speed of the motor during activation in the first activation mode is lower than a rotation speed of the motor during activation in the second activation mode.

27. A non-transitory computer-readable recording medium encoded with an activation program executed by a computer controlling an image forming apparatus including a hardware resource, wherein
   the computer,
   in response to entry of a user into a first range, activating the hardware resource from a power saving mode to a first activation mode, wherein the first activation mode is less active than a state in which the apparatus is ready to perform an image forming operation; and
   in response to entry of the user into a second range that is smaller than the first range, activating the hardware resource to a second activation mode that causes production of sound at a volume level higher than a volume level of sound produced in the first activation mode.

* * * * *